(No Model.)
J. BETZ.
ANIMAL CATCHER.
No. 365,568. Patented June 28, 1887.
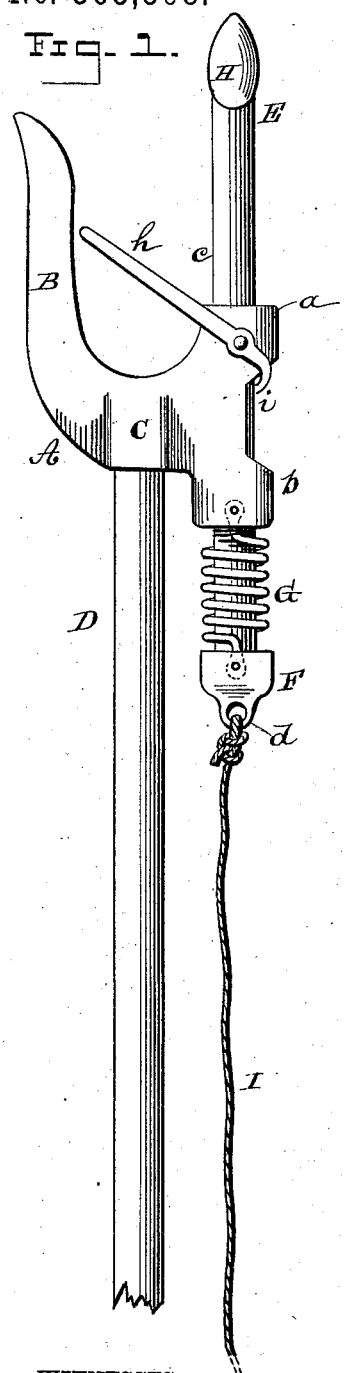
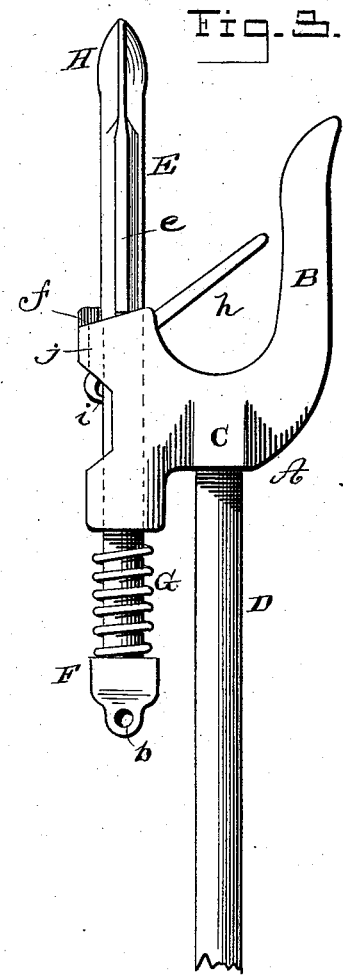
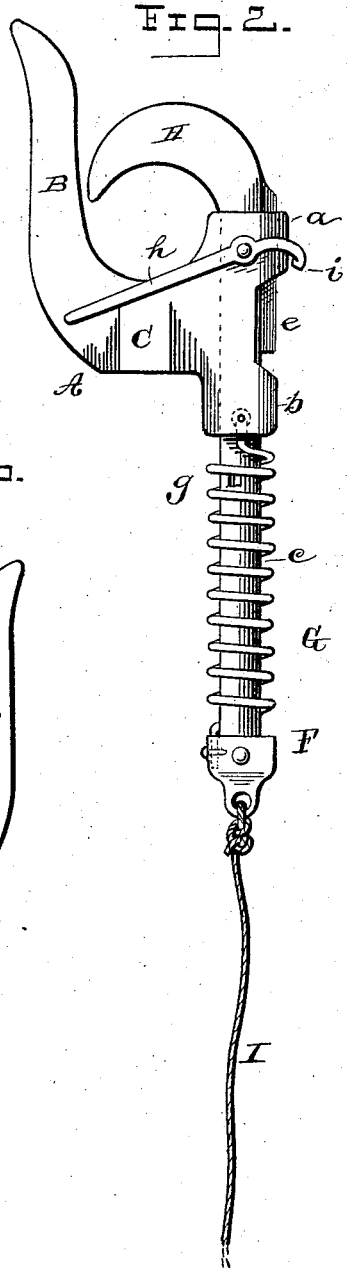
WITNESSES:
O. D. Mott
C. Sedgwick
INVENTOR:
J. Betz
BY Munn & Co.
ATTORNEYS.

UNITED STATES PATENT OFFICE.

JOHN BETZ, OF JORDAN, MINNESOTA.

ANIMAL-CATCHER.

SPECIFICATION forming part of Letters Patent No. 365,568, dated June 28, 1887.

Application filed February 24, 1887. Serial No. 228,703. (No model.)

*To all whom it may concern:*

Be it known that I, JOHN BETZ, of Jordan, in the county of Scott and State of Minnesota, have invented a new and Improved Animal-Catcher, of which the following is a specification, reference being had to the annexed drawings, forming a part thereof, in which—

Figure 1 is a side elevation of my improved animal-catcher, showing the parts adjusted for receiving the leg of the animal. Fig. 2 is a side elevation showing the position of the parts when in engagement with the leg of the animal, and Fig. 3 is an elevation showing the opposite side of the device.

Similar letters of reference indicate corresponding parts in all the views.

The object of my invention is to provide a simple and effective implement for catching sheep, hogs, and other animals by their legs.

My invention consists in a fork having a fixed and a movable arm and mounted removably on a handle, the movable arm being arranged to be pushed forward and turned out of the way to permit of placing the fork on the leg of the animal, and provided with a spring for turning it and bringing it into engagement with the leg of the animal.

It also consists in the combination, with the movable arm of the fork, of a trigger adapted to hold it in an open position, all as hereinafter more fully described.

The fork A is provided with the fixed arm B, the socket C, for receiving the handle D, and with guides $a\ b$, for receiving the movable arm E. The guides $a\ b$ are bored parallel with the socket C and handle D, and the cylindrical shank $c$ of the arm E passes through the guides, and is furnished with a head, F, provided with an eye, $d$. Between the head F and the guide $b$, and surrounding the shank $c$ of the arm E is placed a spiral spring, G, which is attached at one end to the head F and at the opposite end to the guide $b$. The outer extremity of the arm E of the fork is provided with a hook, H, and the back of the shank $c$ adjoining the hook is provided with a feather, $e$, which slides through a groove, $j$, in the outer part of the guide $a$. The end of the guide $a$ is provided with an inclined plane, $f$, upon which the feather $e$ rests when the arm E is drawn upward and turned through one-quarter of a revolution, as shown in Figs. 1 and 3, to bring the hook H out of the way of the leg of the animal. In the shank $c$ is formed a notch, $g$, and to the side of the guide $a$ is pivoted a trigger, $h$, having a hooked end, $i$, adapted to engage the notch $g$ of the shank $c$ and prevent the said shank from turning. When the hook $i$ of the trigger $h$ is in the notch $g$, the longer arm of the trigger extends across the fork toward the fixed arm B. When the hook H is turned through one-quarter of a revolution, (in the manner described,) it puts the spring G under torsion, so that when the hook is released, in the manner presently to be described, the action of the spring and of the inclined plane $f$ turns the hook H around through one quarter of a revolution and parallel with the plane of the fork. A cord, I, is connected with the eye $d$ for the purpose of confining the animal after it is caught in the fork.

My improved device is applied to use by inserting the handle D in the socket C of the fork and arranging the parts as shown in Figs. 1 and 3. By pressing the fork forward upon the leg of the animal the trigger $h$ is brought against the leg and is turned, thus releasing the shank $c$, when it is immediately turned by the spring G until the feather $e$ is opposite the slot in the guide $a$, when the spring draws the hook H forward toward the closed end of the fork, securely holding the leg of the animal.

Having thus fully described my invention, I claim as new and desire to secure by Letters Patent—

1. In an animal-catcher, the combination, with the fork comprising a fixed arm and a horizontally-revoluble and longitudinally-movable arm having a hook, of means for turning the movable arm to throw its hook toward the fixed arm when said arm is moved longitudinally, substantially as set forth.

2. In an animal-catcher, a fork comprising a fixed arm, a socket, and a hooked arm extending loosely through said socket, substantially as set forth.

3. In an animal-catcher, the combination, with the fixed arm B, of the pivoted and sliding arm E, having a hook, the trigger $h$, and the torsion-spring $g$, substantially as and for the purpose set forth.

4. In an animal-catcher, the fork A, provided with a fixed arm, B, and guides $a\ b$, the former having the incline $f$ and groove $j$, the movable arm E, provided with the hook H, feather $e$, and notch $g$, the head F, attached to the movable arm E, the spring G, and the trigger $h$, substantially as described.

JOHN BETZ.

Witnesses:
 C. J. O'BRIEN,
 M. M. SHIELDS.